N. WEISS.
CIGAR BUNCHING MACHINE.
APPLICATION FILED SEPT. 16, 1909.

1,038,041.

Patented Sept. 10, 1912.
8 SHEETS—SHEET 1.

Fig. 1.

WITNESSES

INVENTOR
Nathan Weiss.
Meyers, Cushman & Rea
Attorneys

N. WEISS.
CIGAR BUNCHING MACHINE.
APPLICATION FILED SEPT. 16, 1909.

1,038,041.

Patented Sept. 10, 1912.
8 SHEETS—SHEET 4.

N. WEISS.
CIGAR BUNCHING MACHINE.
APPLICATION FILED SEPT. 16, 1909.

1,038,041.

Patented Sept. 10, 1912.

N. WEISS.
CIGAR BUNCHING MACHINE.
APPLICATION FILED SEPT. 16, 1909.

1,038,041.

Patented Sept. 10, 1912.

N. WEISS.
CIGAR BUNCHING MACHINE.
APPLICATION FILED SEPT. 16, 1909.

1,038,041.

Patented Sept. 10, 1912.
8 SHEETS—SHEET 8.

UNITED STATES PATENT OFFICE.

NATHAN WEISS, OF NEW YORK, N. Y., ASSIGNOR TO AMERICAN CIGAR COMPANY, OF NEW YORK, N. Y., A CORPORATION OF NEW JERSEY.

CIGAR-BUNCHING MACHINE.

1,038,041.   Specification of Letters Patent.   Patented Sept. 10, 1912.

Application filed September 16, 1909.   Serial No. 518,109.

*To all whom it may concern:*

Be it known that I, NATHAN WEISS, a citizen of the United States, residing at New York, in the county of New York and State of New York, have invented new and useful Improvements in Cigar-Bunching Machines, of which the following is a specification.

This invention relates to a cigar bunching machine, and has for its object to provide a simple, compact and efficient mechanism for rapidly forming cigar bunches from manually formed, laid and measured fillers, placed by hand in suitable receptacles which successively carry said fillers to a rolling table, where they are deposited on the rolling apron lying on said table, and by means of said apron each filler is rolled, compressed and inclosed in a binder placed by hand on the apron.

One of the principal objects of the invention is directed to the means for conveying the fillers to the rolling table, and comprises, preferably, two horizontally oscillating carrier cups or receptacles supported on a vertically movable sleeve and disposed at such an angle to each other that when one receptacle or cup is in position in front of an attendant waiting to be filled, the other receptacle overhangs the rolling table and apron, and beneath a plunger, on the descent of which the filler in said receptacle is ejected therefrom into a pocket or fold in the apron in advance of the roller, by means of which the bunch is formed. After the filler has been ejected from the receptacle the sleeve is oscillated to bring the newly filled receptacle over the rolling apron and carry the empty receptacle to a second attendant at the opposite side of the machine, who places a filler therein. The first attendant, in the meantime, prepares a new filler while awaiting the return of the receptacle which at this time stands above the rolling table in position to be emptied.

Another object of the invention relates to the means for regulating the tension of the rolling apron, so that it may have sufficient "slack" or fullness to form a pocket for the filler when placed thereon, and take up any "slack" in the apron during the formation of the bunch and the return of the roller.

A further object of the invention relates to means for raising and lowering the filler receptacle in connection with the oscillation thereof, whereby the receptacle, after being filled and swung to the rolling table, is lowered into the trough of said table, carrying with it a part of the rolling apron to form a pocket for the filler. The receptacle remains in its lowered position until the filler has been pushed out by a plunger. The receptacle is then elevated, and when free from the plunger it is swung into position for refilling.

With these and other objects in view the invention consists of the novel combination, construction and arrangement of parts hereinafter described and claimed, and illustrated in the accompanying drawings, in which,—

In the drawings the numeral 1 indicates a flat, horizontal table or plate supported on legs 2 and $2^a$ extending to the floor. Tie rods 3 and 4 connect the legs 2 and $2^a$ below the table 1, and serve to stiffen and brace the frame of the machine. Below the table 1 is a horizontal shaft 5 journaled at one end in a bearing $2^b$ on the leg 2, and at its other end in a bearing 6 on a bracket 7 extending downwardly from the under side of the table 1 near the opposite leg $2^a$. On the shaft 5 are pinned or otherwise fastened cams 8, 9, 10 and 11, and a gear wheel 12 meshing with a gear wheel 13, twice the diameter of the gear wheel 12, on a short shaft 14 sustained in a bearing 15 on the bracket 7, and a bearing 2ᶜ on the leg 2ᵃ. Power may be applied directly to either shaft 5 or 14, or indirectly through the medium of gear wheels a, b, c and d, the latter gear wheel being carried on the end of shaft 5, as shown in dotted lines Figs. 3 and 4. As thus constructed and arranged, two revolutions of the shaft 5 are required for one rotation of the shaft 14 and the cam 24 thereon.

Referring to Figs. 1 to 5, a vertical shaft 16 extends through a hole in the plate 1 and projects a suitable distance both above and below said plate. Surrounding the shaft 16 is a fitted cylindrical sleeve 17, in which sleeve said shaft is adapted to be moved longitudinally; that is to say, in a vertical direction, by means of an arm 18 mounted on a short spindle 19 carried in suitable bearings fastened on the under side of the plate 1. The arm 18 has a forked end 20 flexibly connected to the lower end of the vertical shaft 16, as shown. A second arm 21 on the spindle 19, and set at approximately a right angle to the arm 18, has its free end pivotally connected to one end of a reciprocating cam bar 22 forked at its opposite end to straddle the shaft 5 and be guided thereby. Adjacent one side of the reciprocating cam bar 22 is the cam disk 11 formed with a cam groove in one face thereof to receive a roller 23 on the side of said cam bar, so that at each rotation of the cam 11 the vertical shaft 16 will be raised and lowered, the extreme positions of said shaft 16 being represented in Figs. 3 and 5.

The cylindrical sleeve 17, surrounding the vertical shaft 16, is mounted to oscillate about its axis in a bearing 25 formed with or fastened on the upper side of the table 1. Below the table is a second bearing 26 for the sleeve 17, between which bearing and the under side of the table, and fixed on said sleeve, is a pinion 27 in engagement with a horizontal rack 28, which oscillates said pinion and the sleeve 17. The rack 28 is slidably mounted in bearing blocks 29 and provided on one side, preferably the side opposite the teeth of the rack, with a boss from which projects a pin 30 that engages in a slot 31 in the upper end of a vertical rocking lever 32 fulcrumed on the tie rod 3. A reciprocating cam bar 33, similar to the reciprocating cam bar 22, is pivotally connected at one end with the rocking lever 32 between the ends of the latter, and straddles the short shaft 14 at its other end. A roller 34 on the cam bar 33 engages the groove of the cam 24 on the shaft 14. From this arrangement of parts it will be observed that at each rotation of the cam 24 the rack bar 28 oscillates the sleeve 17, first in one direction and then in the other. Attention is here directed to the fact that because of the slower movement of the shaft 14, the vertical shaft 16 will reciprocate in both directions in the same space of time required for each semi-oscillation of the sleeve 17. The object of this differential movement between the bar and sleeve will be presently described.

In bunching machines of this type three attendants are usually employed to keep the machine up to its full capacity, two attendants for preparing the fillers, and one at the rolling table to place the binders on the rolling apron and remove the completed bunch from the machine. One means which may be employed for carrying the fillers to the rolling table will now be described.

Adjustably secured on the upper end of the sleeve 17 is a collar 35, from which extend two pairs of ears 36, said pairs being disposed with relation to each other at a horizontal angle of about one hundred thirty-five degrees more or less, as occasion requires. Between each pair of ears are pivotally mounted two vertically movable parallel arms 37 and 38, situated one above the other, and pivotally connected at their outer ends with a cup or receptacle 39, in which the filler tobacco is placed by an attendant. The upper side of each upper arm 37 is provided with a suitable notch 40, here shown as formed by a hook-shaped lug 41 on said arm, which notch engages with a pin or roller 42 mounted on a bracket 43 carried by a rod 44 slidable vertically in the projecting end of an arm 45 adjustably attached to the upper end of the vertically movable shaft 16, and projecting toward the rolling table 46. It will thus be clear that when the shaft 16 is raised and lowered by the cam 11, the arm 37 engaging the pin or roller 42 will move in unison therewith and the cup or receptacle 39 carried by said arm, and the arm 38 will be elevated and depressed. Further, when the cam 24 operates the rack 28 by the means described, the sleeve will be oscillated and the cups 39 supported thereon will be carried alternately from the right and left to and above the rolling table, and the notch 40 brought into engagement with the pin or roller on the arm 45, so that the cup or receptacle 39 above said rolling table may be lowered and raised when the bar 16 is operated in the manner hereinabove described.

The cups or receptacles 39 are supported in their elevated position after leaving the rolling table and while being filled, and prevented from moving laterally when lowered to the rolling table by means of a horizontal disk 47 affixed on the upper end of the sleeve bearing 25, and provided with an inclined track 48 on its upper surface, to which track is connected a downwardly extending slot 49 in line with the center of the rolling table to receive successively the arms 38 when the cups 39 are swung to their discharge position above the rolling table. On the under side of each arm 38 is a roller 50, which rollers travel on the inclined track 48 to right or left of the groove 49 when the sleeve 17 is oscillated, and drops into said groove when the receptacle is brought to discharge position.

Fillers placed in the receptacles 39 are retained therein by an inclined bottom 51, hinged by one edge on the rear side of said receptacle, and its opposite free edge held close against the front wall of the receptacle by a spring 52. When pressure is applied to the filler in the receptacle, the bottom 51 is swung open and the filler escapes, the bottom closing as soon as the receptacle is empty.

The rolling table 46 lies in a horizontal plane slightly above that of the main table 1, to one edge of which it is fastened in front of the vertically movable shaft 16 and sleeve 17. The rolling table 46 projects outwardly with a lateral curvature as shown, and is formed with a trough 53 into which the receptacle 39 enters when lowered. Fastened on the front edge of the rolling table 46 is a curved rolling apron 54 which lies normally on said table and extends rearwardly over the trough 53 to a horizontally swinging lever 55 and is attached thereto. The swinging lever 55 which takes up the slack in the apron, is pivoted on the main table 1 a suitable distance on one side of the rolling table, and is operated by a rocking lever 56, projecting upwardly through a slot in said table and connected by a link 57 with the swinging lever 55. The cam 10 on the shaft 5 reciprocates in a longitudinal direction, a cam bar 58 pivotally connected to the rocking lever 56 which is fulcrumed at its lower end on a shaft 59 mounted in bearings 60 on the legs 2. The contour of the cam 10 is such that when the filler receptacle 39 enters the trough 53 of the rolling table, the cam will cause the rocking lever to swing the horizontal lever 55 forward, slacking the apron. This movement of the lever 55 permits the receptacle to carry the apron with it into the trough and thus form the loop or pocket 54ª in the apron into which the filler is deposited when forced out of the receptacle.

After a filled receptacle has been swung into position over the trough 53 of the rolling table and lowered thereinto, some means for pushing the filler out of the receptacle is necessary. For this purpose a plunger 61 may be used. The plunger is mounted on a stem 62 adjustably carried by an arm 63 fastened on or near the upper end of a vertical sliding bar 64 mounted in bearings 65 and 66 projecting from the front of the machine at one end. Affixed to the horizontal shaft 59 is an arm 67 which projects outwardly toward the sliding bar 64 and is connected thereto through the medium of a link 68. Toward the opposite end of the shaft 59 is fastened thereon a second and shorter arm 69 extending upwardly and connected to a reciprocating cam bar 70 provided with a roller 71 and moved longitudinally by the cam 9 on the shaft 5. The connection between the arm 69 and the reciprocating bar 70 is made adjustable by slotting the arm 69, as shown.

At the proper time the cam 9, through the means described, causes the plunger 61 to descend into the charged cup or receptacle 39 as it stands with its lower end in the pocket of the rolling apron, and forces the filler tobacco from said receptacle into the aforesaid pocket. The receptacle and plunger are then elevated by their separate cams and the bunch roller 72 set in operation in the following manner. Pivotally mounted in bearings 73 and 74 at one side of the machine, and projecting beyond the front thereof, is a vibratory arm 75, on the upper side of which are two upstanding brackets 76, one on each side of the curved rolling table 46, in which the bunch roller 72 is journaled. Preferably, the axis of curvature of the rolling table is coincident with the axis of vibration of the arm 75. In the drawings, the roller 72 is shown of tapered form, but it may be cylindrical or of other desired shape. The ends of a link 77 are connected respectively to the vibrating arm 75 near its bearings, and to the upper end of an upright lever 78 fulcrumed at its lower end on the tie bar 3, which also serves as a fulcrum for the lever 32. Intermediate the ends of the lever 78 is pivoted a reciprocating bar 79 operated by the cam 8. The contour of the cam 8 is such that as soon as the cup or receptacle and the plunger have been raised sufficiently high, the vibrating arm 75 and the bunch roller 72 are swung outwardly, closing the pocket in the rolling apron 54 which partly surrounds the roller, and, as said roller travels over the rolling table 46, compresses the filler and wraps the binder, lying on said apron, around the filler. When the bunch reaches the end of the rolling table it is deposited in a spring holder 80 on the end of said table, and the roller is returned to its initial position. The bunch is removed from the spring holder 80 by the same attendant who places the binder on the rolling apron.

In the modified form of the invention, illustrated in Figs. 8 to 13, the vertical shaft 16 had adjustably fastened thereon at its top a hub 81 from which two radial arms 82 project at substantially the same horizontal angle as the arms 37 in the preferred form of the machine. On each of these arms 82 is secured a right angled plate 83, the horizontal portion thereof being longitudinally slotted and adjustably fastened by a bolt 84 on the arm 82. The downwardly projecting portion of the plate 83 terminates at its end in oppositely projecting horizontal fingers 85 by means of which the filler cup or receptacle 39 is supported. Directly under the arms 82, and a short distance therefrom, are like arms 86 projecting horizontally from a hub 87 adjustably secured on the upper end of the oscillating sleeve 17 which surrounds the vertical shaft 16. On the end of each arm 86, and adjustably fastened thereto by a bolt 88, is a horizontal tongue 89, in line with said arm and projecting inwardly from the center of a bar 90 perpendicular to said tongue. The ends 90ª of the bar 90 are bent outwardly at right angles to the bar, and fastened on said ends are vertically slotted guide blocks 91 in which ribs 92 on the ends of the filler cup or receptacle 39 are adapted to slide. In this form of the invention the raising and lowering of the cups or receptacles 39 are positive, because of their rigid connection to the vertical shaft 16, but as their ribs 92 remain at all times within the grooves of the guide blocks 91, the receptacles and their supporting arms, as also the vertical shaft 16, will swing in a horizontal plane when the sleeve 17 is oscillated. The means for oscillating the receptacles is substantially the same as in the preferred form, except that the rack bar 28ª engages with an intermediate gear 93 in mesh with the pinion 27 on the sleeve 17, and is operated directly by the cam 24, thus doing away with the lever 32 and cam bar 33. The plunger 61, instead of being both raised and lowered by the cam 9, as in the modified construction, is lowered by the cam and raised by a weight 94 on the end of a cord 95 leading over pulleys 96 to the arm 67 and fastened thereto. The rolling apron 54 is fastened at one end to the extremity of the rolling table 46, and at its opposite end to a horizontally swinging arm 55 as in the preferred form, but its operative means is somewhat different. A peripheral cam 97 on the shaft 5 operates a lever 98 from which a connecting link 99 extends forwardly to a second lever 100, the upper end of which latter lever operates the swinging arm 55, through the medium of a second link 101 to loosen or slacken the rolling apron 54. Resilient means are employed for tightening the rolling apron which comprise two springs 102 connected at one end to a pin 103 on the lever 100, said springs extending rearwardly on opposite sides of the vertical shaft 16, and are attached to the T-head 104 of a threaded stem 105 freely slidable in a bracket 106 rising from the table 1. The tension of the springs is regulated by a thumb nut 107 on the stem 105.

Figure 8:
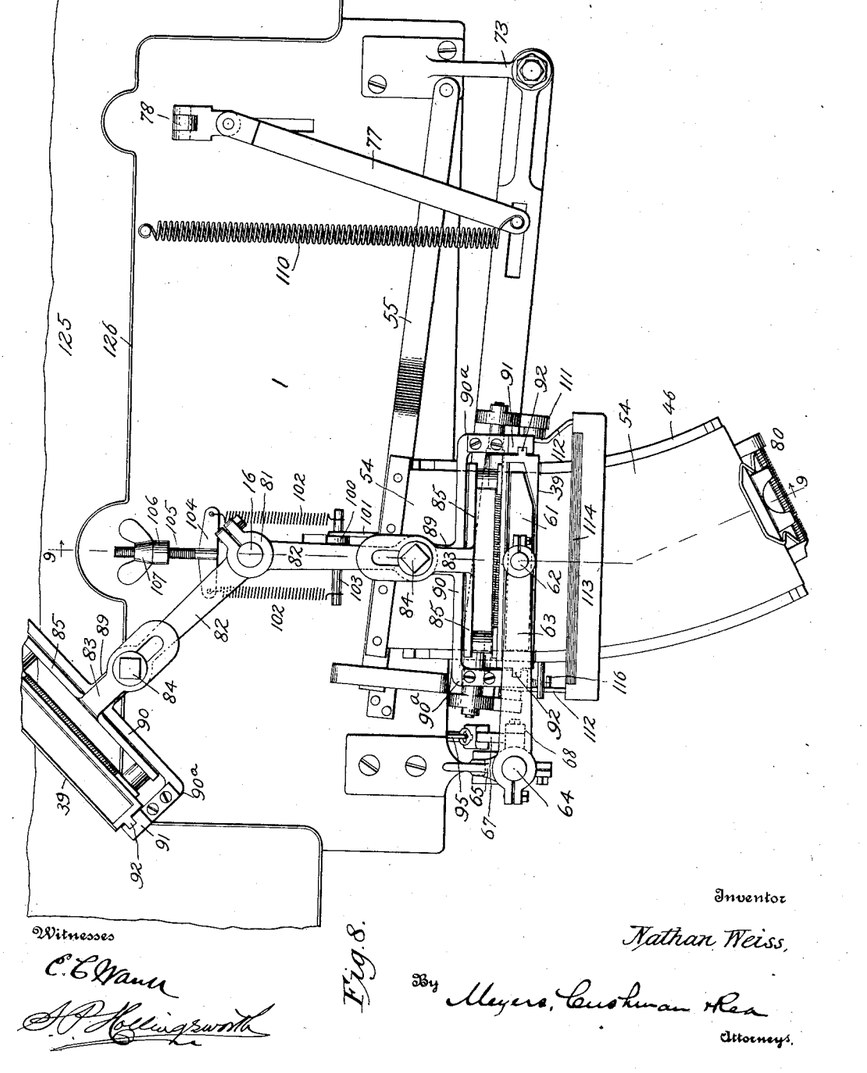
Fig. 8, a plan view of a modified form of the machine.
Figures 9, 14:
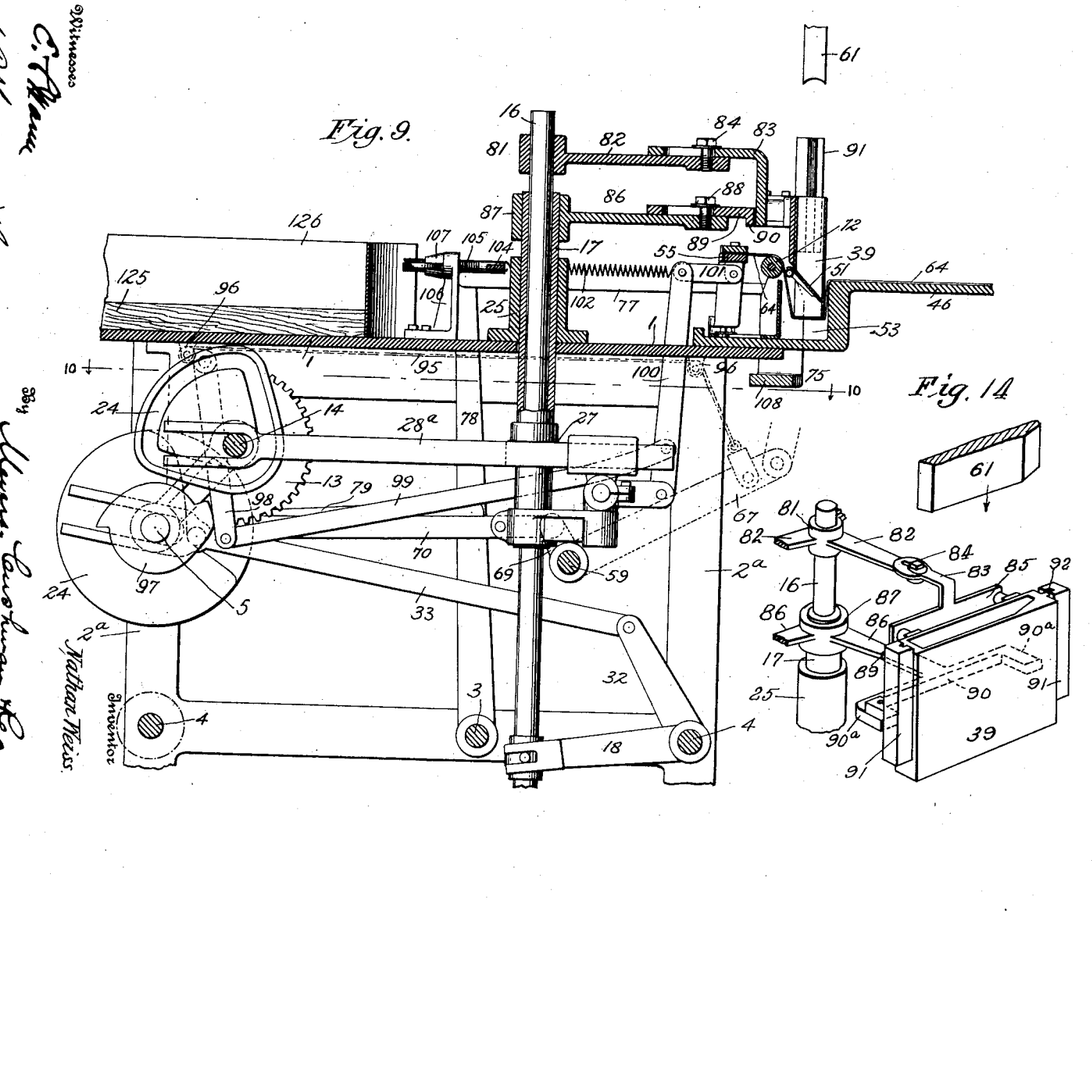
Fig. 9, a transverse sectional view on the line 9—9, of Fig. 8.
Fig. 14 is a detail perspective view of one of the filler carrying receptacles of the form shown in Figs. 8 and 9 and its accompanying parts.
Figure 10:
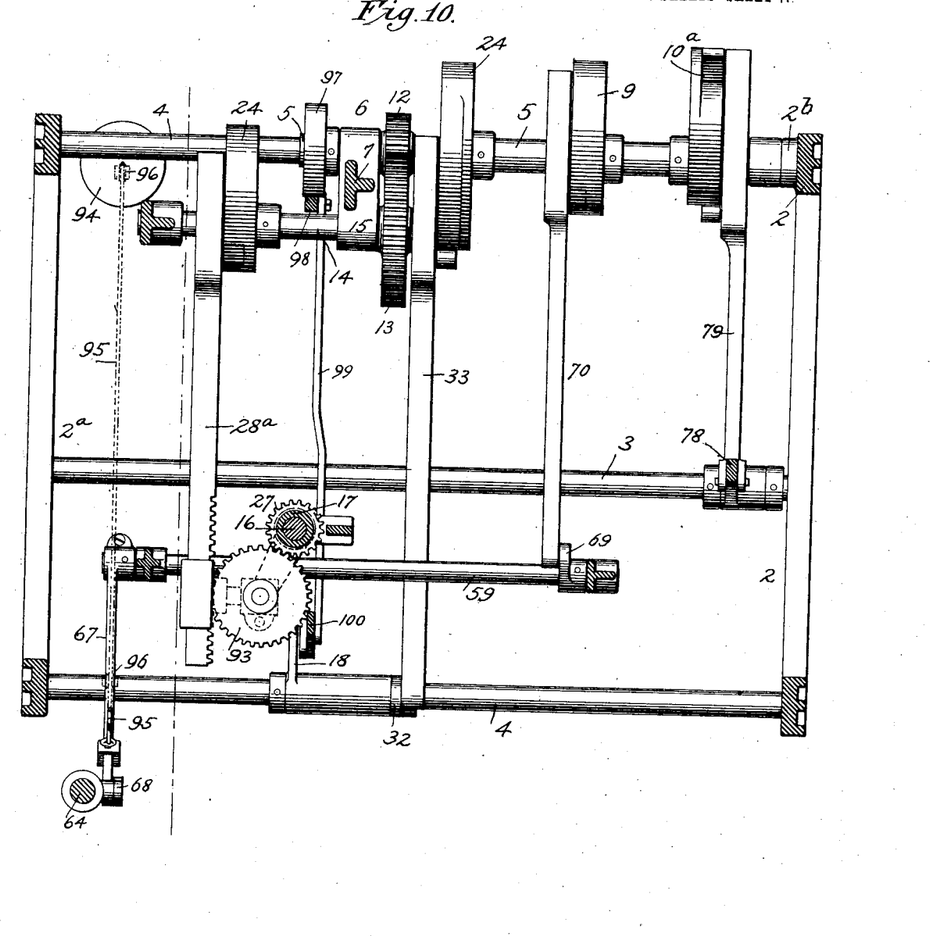
Fig. 10, a horizontal sectional view of the modified form of the invention on the line 10—10 of Fig. 9.
Figure 11:
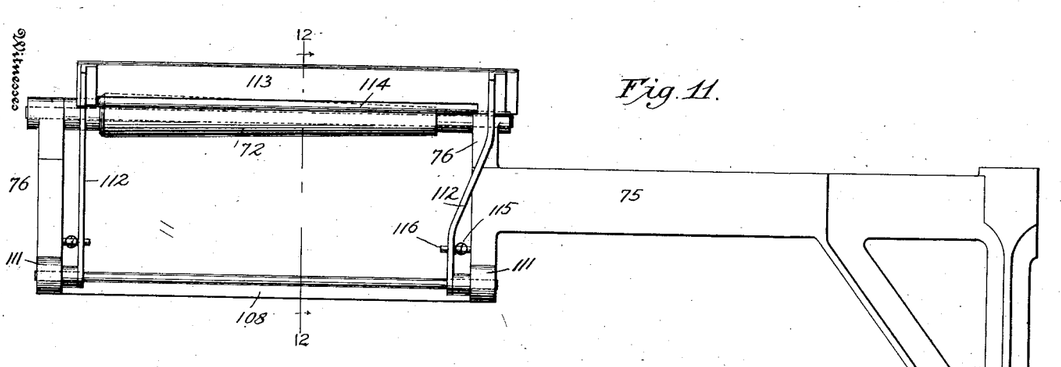
Fig. 11, a front elevation of the vibrating arm which carries the bunch roller.

A slight difference in the construction and operation of the vibrating arm 75, which supports the bunch roller 72, is shown in Figs. 8, 9 and 11. In the modified form of the arm 75 its outer end 108 between the brackets 76, which carry the bunch roller 72, is depressed below the trough 53 and supports at its extremity the outermost bracket 76. The cam 10ª on shaft 5 swings the vibrating arm 75 outwardly to roll the cigar bunch through the medium of a cam bar, rocking lever and link, as previously described; the rocking lever 78 in this instance extends upwardly through a slot 109 in the table 1. The return movement of the vibrating arm 75 is accomplished by a coil spring 110 attached to the arm 75 and to the table 1 by its respective ends.

Figures 12, 13:
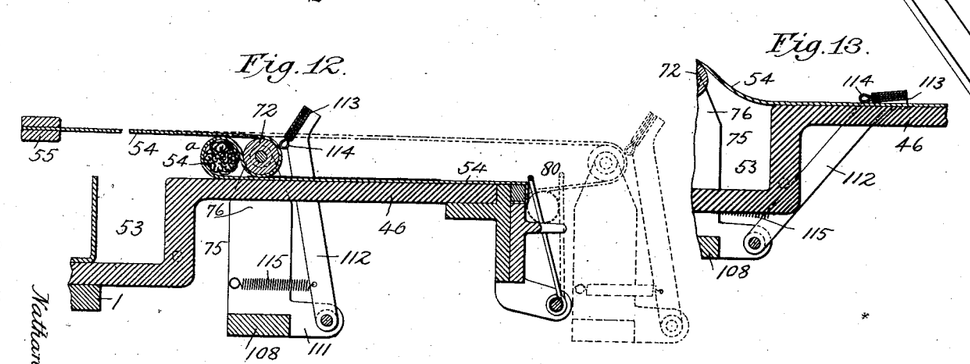
Fig. 12, a cross sectional view on line 12—12 of Fig. 11.
Fig. 13, a similar view showing the parts in different position.

Pivoted on the front of the bunch roller brackets 76, see Figs. 12 and 13, or to lugs 111 projecting therefrom are upwardly reaching arms 112 connected together above the apron 54 by a plate 113, a strip of resilient or yielding material 114, such as rubber, is attached to the rear edge of the plate 113, and is held by a spring 115, connected to a bracket 76 and one of the arms 112, against the upper side of the bunch roller 72, where the apron passes around it, and presses the binder against said apron while rolling the bunch. Upon the return of the vibrating lever 75, one of the arms 112 strikes a stop or pin 116 projecting from one side of the trough 53 before the return movement is completed, and causes said arms 112 to rock on their pivots, drawing the cushion 114 away from the bunch roller and pressing it and the plate 113 on the apron and rolling table 46 just in advance of the trough 53, so that the binder for the next bunch to be rolled may be placed flat on the apron.

The rear of the table 1 is provided with an extension 125 on which loose tobacco is placed to be formed into fillers by the two attendants seated on opposite sides of the extension 125 at A and B, where said extension is beveled. To prevent the filler tobacco from falling on the floor and also encroaching on the table 1, a low rail 126, see Fig. 8, may be placed around the extension 125.

Figure 1:
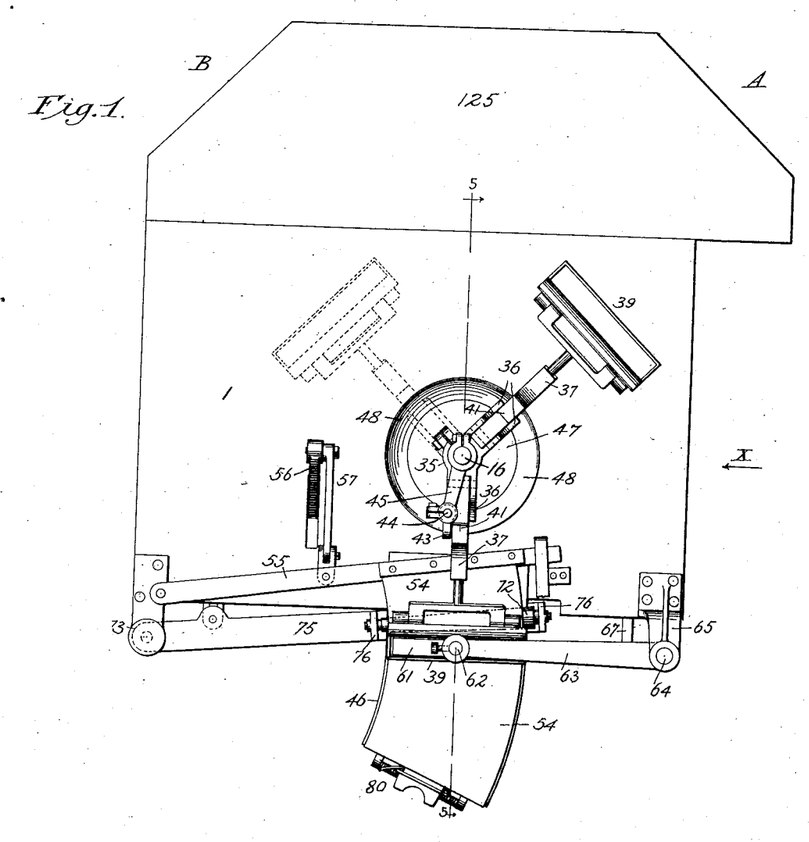
Figure 1 is a plan view of one form of the invention.
Figure 2:
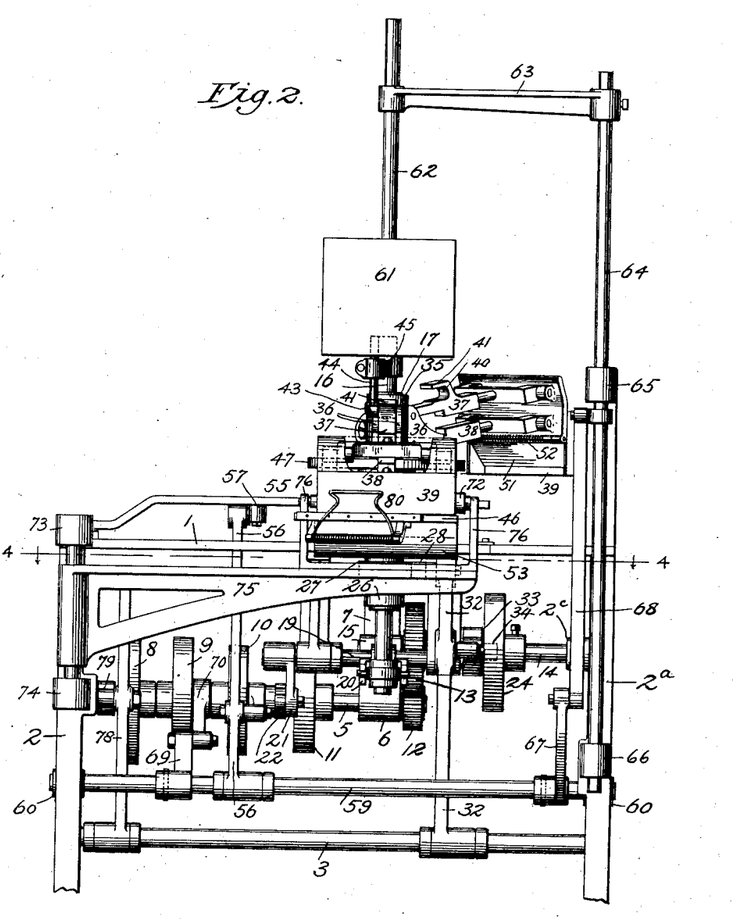
Fig. 2, a front elevation of the same.
Figures 3, 6, 7:
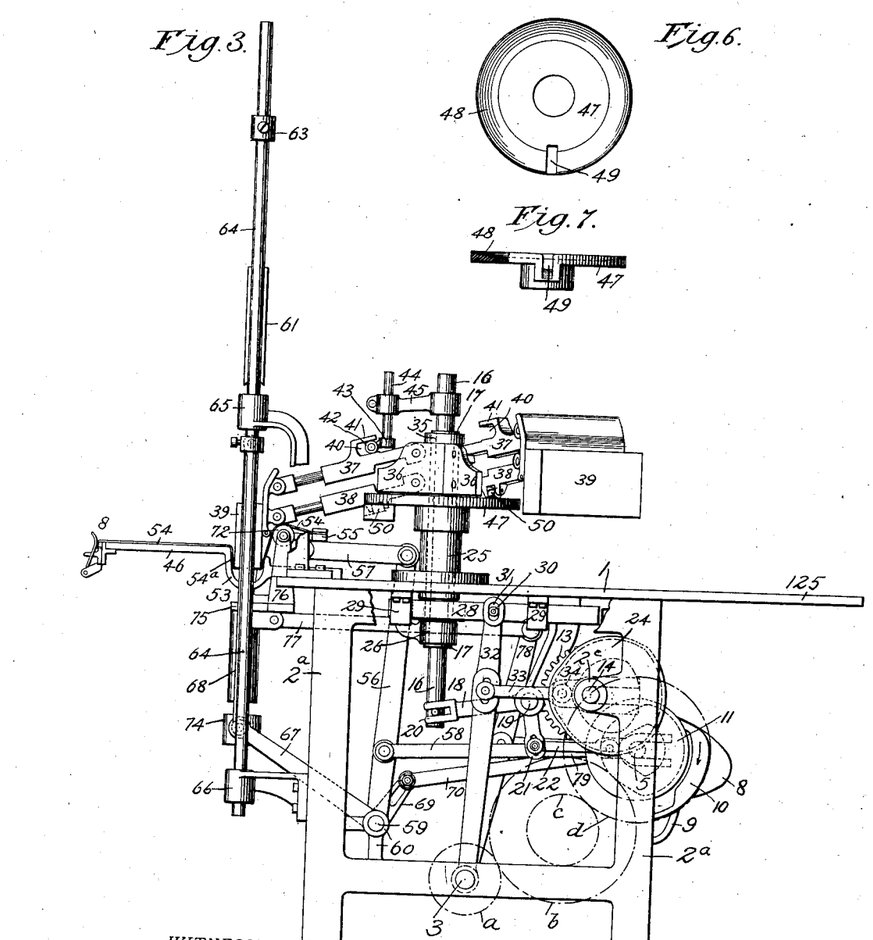
Fig. 3, a side elevation of the bunching machine, viewed in the direction of the arrow X, Fig. 1.
Fig. 6, a plan view of a detail of the invention.
Fig. 7, an elevation of the same.
Figure 4:
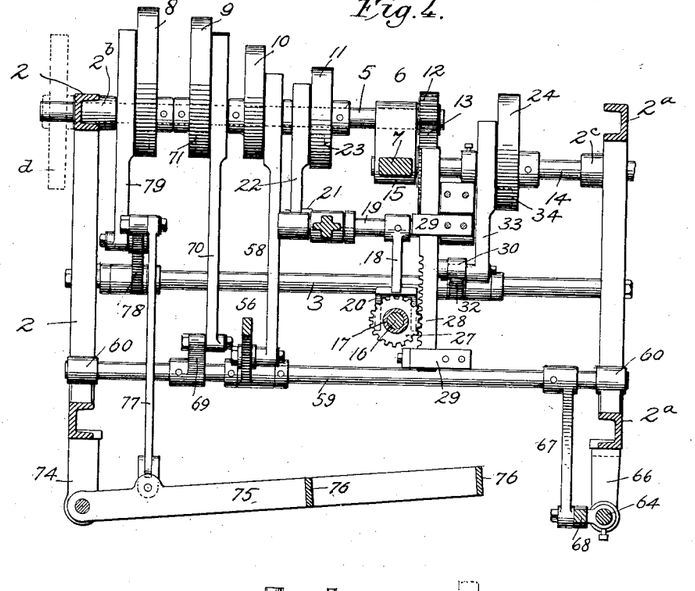
Fig. 4, a horizontal sectional view on the line 4—4, Fig. 2.
Figure 5:
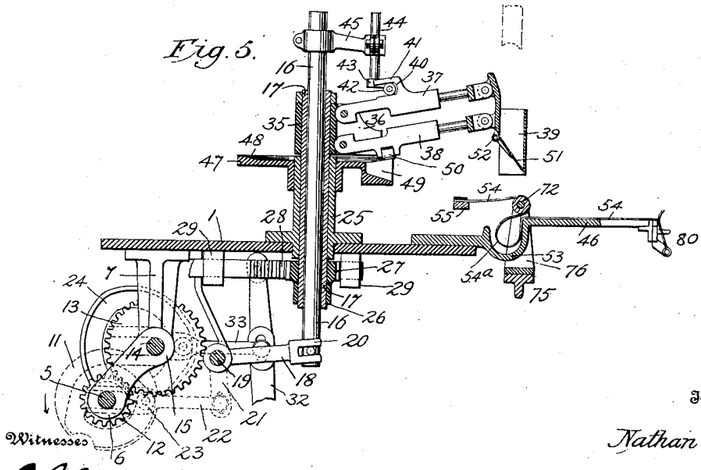
Fig. 5, a transverse sectional view on the line 5—5, of Fig. 1.

In the operation of the machine let it be assumed that the extension 125 of the table contains a quantity of filler tobacco, and that an attendant is seated at each side thereof at A and B, whose duty it is to form, measure and arrange said filler tobacco so that it may be placed in the cups or receptacles 39. At the end of the rolling table 46 will be seated a third attendant whose duty it is to straighten out the binder and place it on the rolling apron 54 in position to be wrapped around the filler, and also to remove the bunch after it has been rolled. The machine being now set in operation with the cups or receptacles 39 in the position indicated in Fig. 1, the attendant at the point A will pick up sufficient tobacco to form a filler, and after manipulating it will place it in the receptacle 39 in front of her and proceed to form another filler; the other attendant will also be forming a filler. After the filler has been placed in the receptacle, the cam 24, in its rotation, will operate the rack 28 and cause the sleeve 17 to be oscillated sufficiently far to bring the filled receptacle over the rolling apron and carry the empty receptacle from said rolling apron into the position shown by dotted lines in Fig. 1 in front of the second attendant at B, who by this time will have completed the filler on which she has been working. The filled receptacle, after reaching the rolling apron, is lowered into the trough 53 of the rolling table, carrying the rolling apron with it, as shown in Fig. 3. This lowering of the receptacle is accomplished by means of the cam 11 acting through the mechanism described, to draw down the vertical shaft 16. Just before the cup or receptacle has reached the rolling apron, the swinging arm 55, to which the inner end of the rolling apron is attached, is moved toward the receptacle by means of the cam 10, thereby slackening the apron and permitting it to be carried into the trough 53 with said receptacle, thereby forming the pocket 60. The vertical shaft 16 and the sleeve 17 at this point remain inoperative for a short while and hold the receptacles temporarily at rest. so that the attendant at B can place the formed filler in the receptacle before her and enable the plunger 61 to descend into the receptacle above the rolling apron and force the filler contained in the receptacle into the pocket 60, and then start to return, at which point the cam 11 begins to raise the vertical shaft 16 and lift the receptacle from the trough and above the surrounding mechanism so that both receptacles may be oscillated simultaneously in the opposite direction to bring the newly filled receptacle above the rolling apron and the empty receptacle once more into its position opposite the attendant at A. During the oscillating movements of the receptacles, and before either starts to bring a new charge of filler material to the rolling apron to be bunched, the vibrating arm 75 carrying the bunch roller 72 is swung out over the curved rolling table and causes said roller to first close the pocket 60 around the filler, and then roll said filler along the rolling table so as to inclose it in the binder which has previously been placed on the apron. At the end of the movement of the vibrating arm the bunch thus formed is delivered into the holder 80 at the front end of the rolling table, and the vibrating arm returns to its initial position. After the filler material has been placed in the pocket of the rolling apron and the bunch roller starts to roll the same, the swinging arm 55, to which the apron is attached, is moved rearwardly to properly tension the apron around the bunch to suitably compress the same.

What is claimed as new is,—

1. In a cigar bunching machine, a table, a bunch forming mechanism, and a filler feed mechanism comprising two filler receptacles adapted to oscillate about a common axis alternately between said bunch forming mechanism and opposite sides of the table.

2. In a cigar bunching machine, a table, a bunch forming mechanism, and a filler feed mechanism comprising two filler receptacles angularly disposed in fixed relation to each other adapted to oscillate in a plane about a common axis alternately between said bunch forming mechanism and opposite sides of the table.

3. In a cigar bunching machine, a table, a bunch forming mechanism, and a filler feed mechanism comprising two filler transporting receptacles fixed rigidly at an angle to each other and adapted to oscillate in unison and in the same plane about a common axis and alternately between the common bunch forming mechanism and opposite sides of the table.

4. In a cigar bunching machine, a table, a bunch-forming mechanism, a filler feed mechanism comprising two filler receptacles angularly disposed with relation to each other and adapted to oscillate in unison about the same axis alternately between the common bunch forming mechanism and opposite sides of the table, means for moving the receptacle above the bunch forming mechanism into coöperative relation therewith, and a plunger for forcing the contents of said receptacle onto the bunch-forming mechanism.

5. In a cigar bunching machine, a bunch-forming mechanism, an oscillating shaft, duplicate filler transporting receptacles adapted to swing vertically and oscillate about a common axis between separate filling station and a common bunch-forming mechanism, means adapted to hold said filler receptacles in upright position when they swing vertically connecting said receptacles to the oscillating shaft, means movable in the axis of oscillation for lowering the filler receptacles into close proximity to the bunch-forming mechanism, means for discharging the contents of said receptacles thereon, and means for oscillating the shaft.

6. In a cigar bunching machine, a bunch forming mechanism, duplicate filler transporting receptacles adapted to oscillate about a common axis between separate filling stations and the common bunch forming mechanism, means movable in the axis of oscillation for lowering said receptacles into close proximity to the bunch forming mechanism, means for discharging the contents of the receptacles thereon, and means for oscillating the receptacles.

7. In a cigar bunching machine, a bunch forming mechanism, an oscillating shaft, duplicate filler transporting receptacles adapted to oscillate with said shaft about a common axis between separate filling stations and the common bunch forming mechanism, a rod movable longitudinally of said shaft provided with means for raising and lowering said receptacles, means for oscillating the receptacles, and means for moving said rod to lower the receptacles into close proximity to the bunch forming mechanism when over the same.

8. In a cigar bunching machine, a bunch forming mechanism, an oscillating hollow shaft, a pair of filler transporting receptacles mounted to oscillate with said shaft, a rod extending through said hollow shaft and movable in an axial direction, means carried by said rod for raising and lowering said receptacles, and separate means for oscillating the hollow shaft and operating the rod.

9. In a cigar bunching machine, a bunch forming mechanism, an oscillating hollow shaft, a pair of filler transporting receptacles mounted to oscillate with said shaft, a rod extending through said hollow shaft and movable in an axial direction, means carried by said rod for raising and lowering said receptacles, and a rack and pinion gear for oscillating said hollow shaft.

10. In a cigar bunching machine, a bunch forming mechanism, an oscillating hollow shaft, a pair of filler transporting receptacles mounted on said shaft and movable with it, a rod extending through said hollow shaft and movable in an axial direction, means carried by said rod for engaging each receptacle when above the bunch forming mechanism and lowering it into close proximity thereto, and means for ejecting the contents of the receptacles.

11. In a cigar bunching machine, a bunch forming mechanism, an oscillating hollow shaft, a pair of filler transporting receptacles mounted on parallel bars pivoted to said shaft and movable with it, a rod extending through said hollow shaft and movable in an axial direction, means carried by said rod for engaging each receptacle when above the bunch forming mechanism and lowering it into close proximity thereto, and means for ejecting the contents of the receptacles.

12. In a cigar bunching machine, a bunch forming mechanism, an oscillating hollow shaft, and a collar thereon, a pair of filler transporting receptacles each mounted on parallel bars pivoted on said collar and movable with the shaft, a guide plate for holding said receptacles in elevated position provided with a notch, a rod extending through said hollow shaft and movable in an axial direction, and means carried by said rod for engaging each receptacle when above the bunch forming mechanism and in line with the notch in said guide plate and lowering said receptacle into close proximity to the aforesaid bunch forming mechanism.

13. In a cigar bunching machine, a bunch forming mechanism comprising a rolling table and a rolling apron, an oscillating hollow shaft having a collar thereon, a pair of filler transporting receptacles each mounted on parallel bars pivoted on said collar and movable with the shaft, a hook on one of each set of parallel bars, a guide plate for holding said receptacles in elevated position and provided with a notch, a rod extending through said hollow shaft and movable in an axial direction, means carried by said rod for engaging said hooks when the receptacles are above the rolling apron and the parallel bars in line with said notch and lowering the receptacles onto the rolling apron, forming a loop therein, and means for discharging the contents of the receptacles into said apron loop.

14. In a cigar-bunching machine, a bunch-forming mechanism, an oscillating vertical shaft, a pair of filler transporting receptacles mounted on parallel bars pivoted to said shaft and adapted to swing vertically thereon and oscillate therewith, a catch on each receptacle, and vertically movable means having a projection arranged to engage said catch on each receptacle when above the bunch-forming mechanism and lower said receptacle into close proximity to and raise it above the same.

15. In a cigar-bunching machine, a bunch-forming mechanism, an oscillating vertical shaft, a pair of filler transporting receptacles angularly disposed with relation to each other, parallel bars pivoted to each receptacle and to said shaft whereby said receptacles may swing vertically on the shaft in an upright position and oscillate horizontally therewith, a catch on one of said bars pivoted to each receptacle, a rod movable in an axial direction, and means carried by said rod for engaging each catch when a receptacle is above the bunch-forming mechanism and lower the receptacle into close proximity thereto.

In testimony whereof I have hereunto set my hand in presence of two subscribing witnesses.

NATHAN WEISS.

Witnesses:
L. A. HAMMERSLEY,
M. E. FINCH.

Copies of this patent may be obtained for five cents each, by addressing the "Commissioner of Patents, Washington, D. C."